United States Patent [19]
Omori et al.

[11] Patent Number: 5,524,161
[45] Date of Patent: Jun. 4, 1996

[54] FINGERPRINT IMAGE PROCESSING SYSTEM CAPABLE OF SIMPLY PROCESSING MINUTIAE

[75] Inventors: Ritsuko Omori; Isamu Suzuki; Tatsuo Shibuya; Yukio Hoshino; Kazuo Kiji, all of Tokyo, Japan

[73] Assignee: NEC Corporation, Tokyo, Japan

[21] Appl. No.: 437,889

[22] Filed: May 10, 1995

Related U.S. Application Data

[63] Continuation of Ser. No. 183,249, Jan. 19, 1994, abandoned, which is a continuation of Ser. No. 863,123, Apr. 3, 1992, abandoned.

[30] Foreign Application Priority Data

| Apr. 3, 1991 | [JP] | Japan | 3-098257 |
| Apr. 3, 1991 | [JP] | Japan | 3-098258 |
| Apr. 3, 1991 | [JP] | Japan | 3-098259 |

[51] Int. Cl.⁶ .................................. G06K 9/00
[52] U.S. Cl. .................................. 382/125
[58] Field of Search .................. 382/124, 125; 356/71

[56] References Cited

U.S. PATENT DOCUMENTS

| 4,618,988 | 10/1986 | Schiller | 382/5 |
| 4,905,293 | 2/1990 | Asai et al. | 382/4 |
| 4,944,021 | 7/1990 | Hoshino et al. | 382/5 |
| 5,105,467 | 4/1992 | Kim et al. | 382/4 |
| 5,109,428 | 4/1992 | Igaki et al. | 382/5 |

FOREIGN PATENT DOCUMENTS 55-138174  10/1990  Japan.

OTHER PUBLICATIONS

European Search Report mailed Oct. 28, 1993.
K. Asai, et al., "Automatic fingerprint identification", *SPIE*, vol. 182 (1989), pp. 49–56.
K. Asai, et al., "Fingerprint Identification System", *Second USA–Japan Computer Conference*, 1975, pp. 30–35.

*Primary Examiner*—Yon J. Couso
*Attorney, Agent, or Firm*—Sughrue, Mion, Zinn, Macpeak & Seas

[57] ABSTRACT

In a fingerprint image processing system for use in processing a fingerprint image prior to identification of a fingerprint, edition or correction is made by adding true minutiae and/or deleting false minutiae from the fingerprint image displayed on an output device to leave only real minutiae and to formulate a minutia list which registers a location of each minutia, a minutia direction, and minutia relations representative of adjacent minutia pairs. Edition of the minutiae may be carried out by handling the minutiae as an image while correction may be made by recognizing the minutiae as data. Ridge numbers between two adjacent ones of the minutiae are included in the minutia relations and may be manually or automatically extracted from the fingerprint image.

8 Claims, 9 Drawing Sheets

FINGERPRINT IMAGE PROCESSING SYSTEM CAPABLE OF SIMPLY PROCESSING MINUTIAE

This is a Continuation of application Ser. No. 08/183,249 filed Jan. 19, 1994 now abandoned, which is a Continuation of application Ser. No. 07/863,123 filed on Apr. 3, 1992, now abandoned.

BACKGROUND OF THE INVENTION

This invention relates to a fingerprint image processing system for use in processing a fingerprint image prior to identification of a fingerprint.

In general, a fingerprint is widely used for identifying a person due to uniqueness, idiosyncrasy, and unchangeability of the fingerprint. Recently, such identification of the fingerprint is automatically carried out by the use of a pattern recognition technique in an electronic computer. For this purpose, ridge endings, bifurcations are extracted from a fingerprint image together with ridges and collated with those of registered or memorized fingerprints. The ridge endings, the bifurcations may be called minutiae hereinunder.

Herein, it is to be noted that a fingerprint image left at a criminal or an accidental spot or place is often extracted from an object which might be decorated itself and/or which is not flat. Under the circumstances, the fingerprint image is not clear on the minutiae and the ridges but is very often obscure. In other words, such a fingerprint image is very often contaminated by such as superfluous lines and dots which might be wrongly recognized as ridges and minutiae and adversely affected by any other defects, such as undesirable deletion of true minutiae and undesirable separation of ridges. Therefore, it is difficult to identify a person by the use of such an unclear fingerprint image.

Taking the above into consideration, the unclear fingerprint image is traced on tracing paper or the like along the ridges to obtain a traced fingerprint image. Subsequently, the traced fingerprint image is memorized into a memory and is displayed on a display device, such as a CRT. Thereafter, minutiae are extracted from the traced fingerprint image and stored in a memory in the form of minutia data signals.

However, a trace operation of the unclear fingerprint image imposes a heavy load on an operator and is time-consuming. In addition, it is not easy to add and delete minutiae to and from the traced fingerprint image and to modify them.

SUMMARY OF THE INVENTION

It is an object of this invention to provide a fingerprint image processing system which is capable of simply processing an unclear fingerprint image on a display device prior to identification.

It is another object of this invention to provide a fingerprint image processing system of the type described, which is capable of readily adding and/or deleting minutiae.

It is still another object of this invention to provide a fingerprint minutia editing system of the type described, which is capable of readily editing a preedition fingerprint image on the display device.

It is yet another object of this invention to provide a fingerprint minutia correction system which is capable of readily correcting minutia data signals on the display device.

A fingerprint image processing system to which this invention is applicable is for use in processing an input fingerprint image extracted from an object to produce a processed fingerprint image signal representative of a processed fingerprint image. The input fingerprint image includes minutiae and ridges. According to an aspect of this invention, the fingerprint image processing system comprises display means for visually displaying the input fingerprint image, modifying means for modifying the minutiae to leave only real minutiae on the display means and to obtain the processed fingerprint image on the display means, list formulating means for formulating a minutiae list in relation to the real minutiae and the ridges, and means for storing the minutiae list as the processed fingerprint signal.

According to another aspect of this invention, a fingerprint minutia editing system is for use in editing a preedition fingerprint image extracted from an object to produce an edited fingerprint signal representative of an edited fingerprint image by processing minutiae of the preedition fingerprint image as minutia images and by modifying the minutia images to formulate the minutia list.

According to still another aspect of this invention, a fingerprint minutia correction system is for use in correcting an input fingerprint image extracted from an object to produce a corrected fingerprint signal representative of a corrected fingerprint image by processing minutiae of the input fingerprint image as minutiae data signals and by modifying the minutia data signals to formulate the minutia list.

DESCRIPTION OF THE PREFERRED EMBODIMENTS

Figure 1:
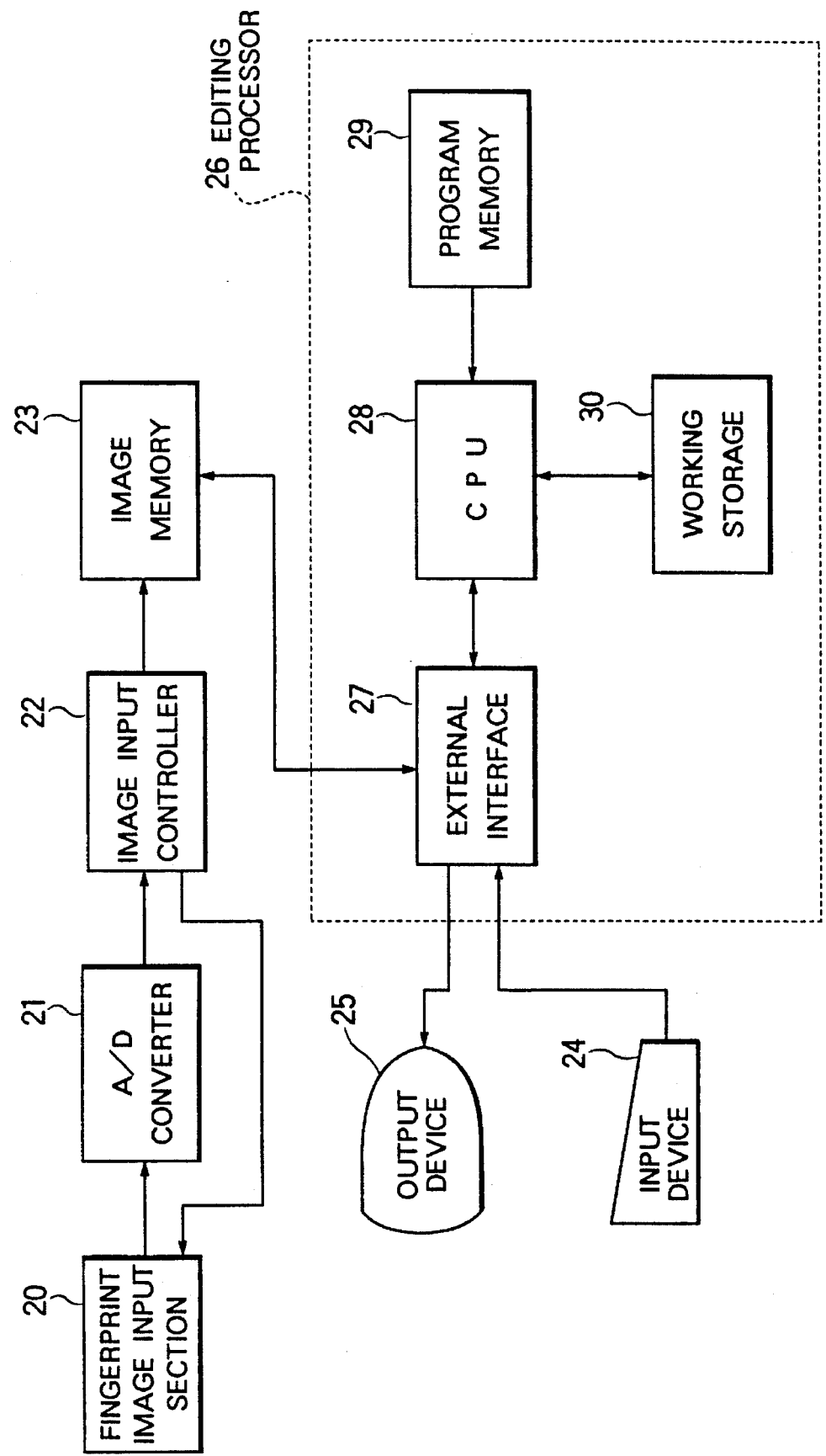
FIG. 1 is a block diagram of a fingerprint image processing system according to a first embodiment of this invention.

Referring to FIG. 1, a fingerprint image processing system according to a first embodiment of this invention is operable as a fingerprint image editing system to edit a preedition fingerprint image extracted from an object and to produce an edited fingerprint signal representative of an edited fingerprint image.

The illustrated fingerprint image editing system comprises a fingerprint image input section 20 which is given a fingerprint image impressed on an original sheet of paper or extracted at a criminal spot and which carries out photoelectric conversion of the fingerprint image to produce a sequence of analog electric signals. The analog electric signals are converted into a sequence of digital image signals by an analog-to-digital (A/D) converter 21. The digital image signals are produced by the A/D converter 21 as two-dimensional quantized image data signals and are sent to an image input controller 22 which is connected to an image memory 23 on one hand and to the fingerprint image input section 20 on the other hand. This shows that the fingerprint image input section 20 is operated under control of the image input controller 22 to send the analog electric signals to the A/D converter 21. The digital image signals are successively memorized into the image memory 23 under control of the image input controller 22. It is to be noted here that the digital image signals are memorized into the image memory 23 as an image and are not recognized as data signals and that the digital image signals are representative of the preedition fingerprint image.

The fingerprint image editing system further comprises a keyboard 24 and a CRT 25 as an input device and an output device, respectively.

In the example being illustrated, an editing processor 26 is connected to the image memory 23, the input device 24, and the output device 25 and is operable in a manner to be described later in detail. More specifically, the editing processor 26 comprises an external interface 27 coupled to the image memory 23, the input device 24, and the output device 25, a central processing unit (CPU) 28, a program memory 29, and a working storage 30. With this structure, the program memory 29 stores a program for controlling an editing operation while the working storage 30 stores data signals, as known in the art. The central processing unit 28 is operable in cooperation with the working storage 30 in accordance with the program read out of the program memory 29.

Figure 2:
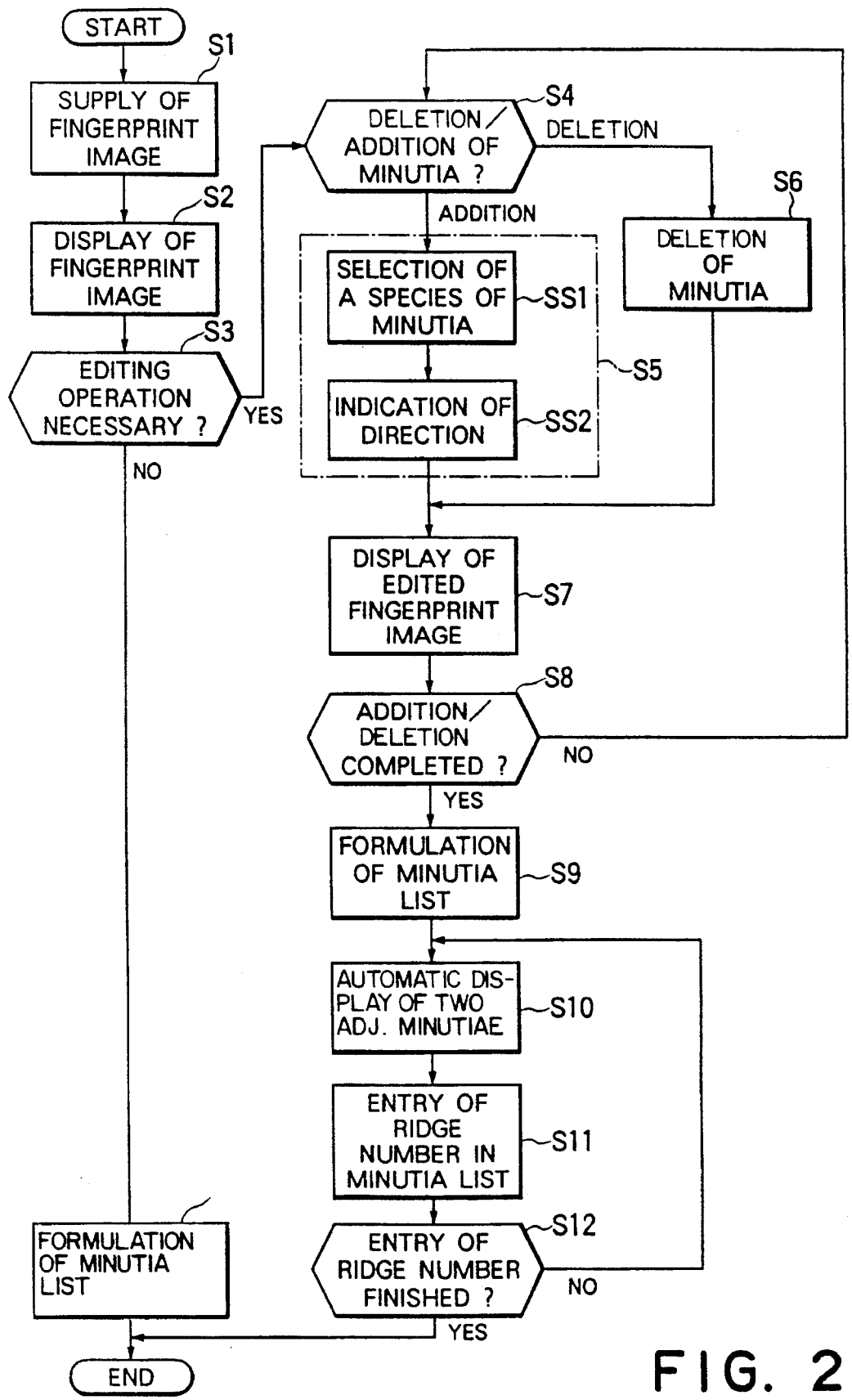
FIG. 2 is a flow chart for use in describing operation of the fingerprint image processing system illustrated in FIG. 1.

Referring to FIG. 2 together with FIG. 1, description will be mainly directed to operation of the editing processor 26. Herein, it is assumed that the digital image signals are stored into the image memory 23 under control of the image input controller 22 in the above-mentioned manner.

Under the circumstances, the digital image signals ere successively read out of the image memory 23 to be supplied to the editing processor 26. In the editing processor 26, the digital image signals are given to the external interface 27 in a known manner, as shown at a first step S1 of FIG. 1 and are displayed as a fingerprint image on the output device 25 in a usual manner, as illustrated at a second step S2 of FIG. 1. The fingerprint image is not edited at this step and may be referred to as a preedition fingerprint image while the digital image signals may be called preedition fingerprint signals.

The following description will be directed to operation carried out under control of the central processing unit 28 as long as no specific description will be made.

The preedition fingerprint image is monitored by an operator to judge whether or not an editing operation is necessary on the preedition fingerprint image, as illustrated at a third step S3. Unless the editing operation is necessary, the editing processor 26 finishes processing the fingerprint image. Otherwise, the third step S3 is followed by the editing operation. During the editing operation, the operator manipulates a pointing device, a mouse device, or the like on the output device 25 to point out a location to be edited. Such a location will be called an indicated location.

Subsequently, a minutia is added to or deleted from the preedition fingerprint image at a fourth step S4 when a minutia is absent or present at the indicated location pointed out by the pointing device, respectively. The fourth step S4 is followed by a fifth step S5 on addition of a minutia to the preedition fingerprint image while the fourth step S4 is followed by a sixth step S6 on deletion of the minutia.

When the operator finds out lack of a true minutia in the preedition fingerprint image, the fifth step S5 is executed so as to add a minutia which may be added as a true minutia. The fifth step S5 is divided into first and second partial steps SS1 and SS2, as shown in FIG. 2. In this event, a menu appears on the output device 25 to visually display the species or kinds of the minutiae composed of ridge endings, bifurcations. In addition, pattern or ridge directions contiguous to the respective minutiae are also displayed on the menu. At the first partial step SS1, selection is made about the species of minutiae on the output device 25 to determine a selected minutia. Specifically, the operator selects one of the minutiae from the menu by the use of the input device 24 (which is operable as the pointing device) to specify a selected species of the minutiae, as shown at the first partial step SS1. At the second partial step SS2, one of the directions is indicated on the menu by the operator as a selected direction. Both the selected species and the selected direction are sent from the input device 24 to the output device 25 through the external interface 27 under control of the central processing unit 28. As a result, the selected minutia is added as a true minutia to the indicated location of the preedition fingerprint image on the output device 25. Thus, an edited fingerprint image is displayed on the output device 25, as illustrated at a seventh step S7.

On the other hand, when the operator finds out a false minutia, the false minutia is deleted from the indicated location of the preedition fingerprint image at the sixth step S6. At any rate, the preedition fingerprint image is edited into the edited fingerprint image by deletion of the false minutia. The edited fingerprint image is displayed on the output device 25 at the seventh step S7, as mentioned above. Such an edited fingerprint image is formed by superposing the real minutia on the preedition fingerprint image with the false minutia deleted, as known in the art.

At an eighth step S8, it is judged whether or not addition and/or deletion of the minutiae is completed. As long as a true minutia is absent or a false minutia is present, the fourth through the seventh steps S4 to S7 are repeatedly executed by the help of the operator under control of the central processing unit 28. Thus, only real minutiae are finally left on the edited fingerprint image together with the ridges.

After completion of the above-mentioned addition and/or deletion, a ninth step S9 follows the eighth step S8 so as to formulate a minutia list by the use of the edited fingerprint image.

Figure 3:
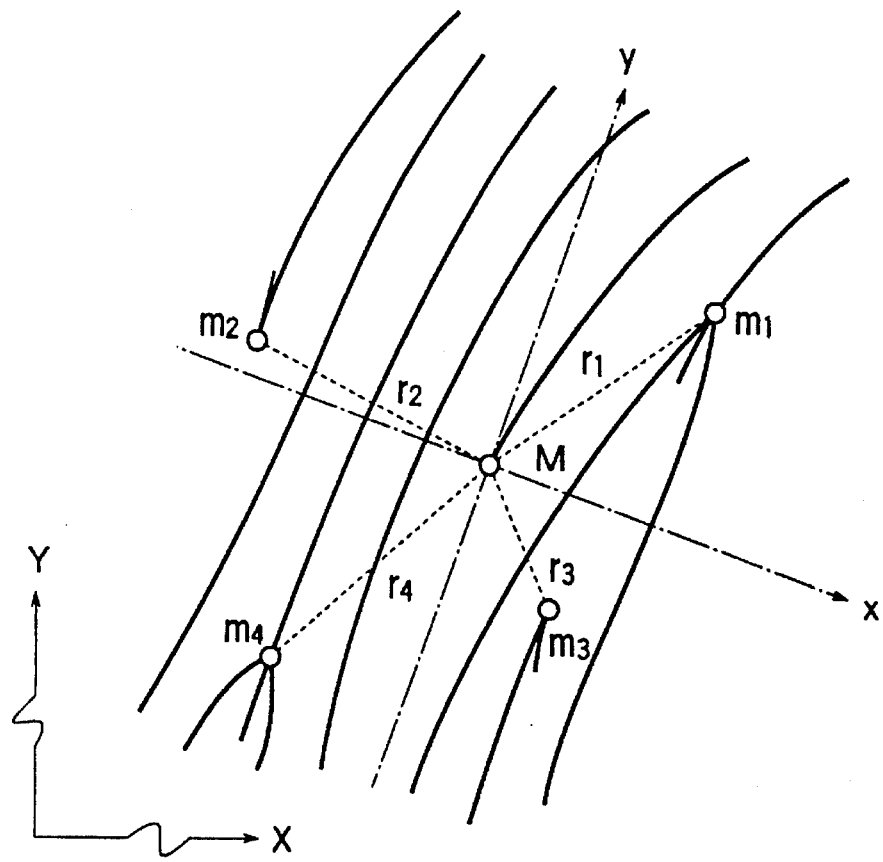
FIG. 3 is an example of a fingerprint image to be processed by the fingerprint image processing system illustrated in FIG. 2.
Figure 4:
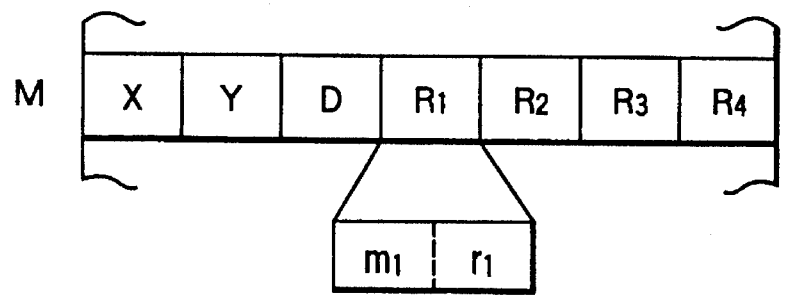
FIG. 4 is a data format for use in describing a minutia list extracted from the fingerprint image illustrated in FIG. 3.

Temporarily referring to FIGS. 3 and 4, description will be made as regards the minutia list. In FIG. 3, the illustrated edited fingerprint image is drawn on an orthogonal coordinate system defined by X- and Y-axes and has a specific minutia M and other minutiae m1, m2, m3, and m4 which are adjacent to the specific minutia M and which may be referred to as adjacent minutiae. Herein, the minutia list is assumed to be formulated in relation to the specific minutia M. As shown in FIG. 4, the minutia list includes a location of the specific minutia M specified by (X, Y) and a ridge direction D at the specific minutia M. The ridge or the minutia direction is determined at the specific minutia M is a known manner disclosed, for example, in Japanese Unexamined Patent Publication No. Syo 55-138174, namely, 138174/1980 and may be called a minutia direction. A relative or local orthogonal coordinate system (x, y) is determined in relation to the specific minutia M so that the tangential direction is coincident with a y-axis of the relative Orthogonal coordinate system. Consequently, first through fourth quadrants are defined in the relative orthogonal coordinate system and serves to specify relative positions of the adjacent minutiae m1 to m4. It is to be noted that only most adjacent minutiae are selected in the respective quadrants as the adjacent minutiae.

Moreover, the illustrated minutia list has minutia relations R1, R2, R3, and R4 which define relations between the specific minutia M and each of the adjacent minutiae m1 to m4. In the example being illustrated, each minutia relation R1 to R4 is composed of the minutia number i of each adjacent minutia mi (i is a natural number from unity to four in the illustrated example, both inclusive) and the ridge number ri of ridges laid between the specific minutia M and each adjacent minutia mi. A combination of the location (X, Y) of the specific minutia M, the minutia number mi, and the ridge number ri will be collectively called a minutia information signal.

Such a minutia information signal is extracted from each of the minutiae in the above-mentioned manner to be formulated into the minutia list which includes the minutia information signals of all the minutiae, as shown at the ninth step S9.

It is to be noted here that the ridge number ri is not determined when the ninth step S9 is finished and is therefore kept empty. In order to fill out the ridge number ri at every one of the adjacent minutiae m1 to m4, the specific minutia M and each of the adjacent minutiae m1 to m4 are automatically and successively displayed in pair on the output device 25 under control of the central processing unit 28 in accordance with the program stored in the program memory 29, as illustrated at a tenth step S10.

In the illustrated example, the ridge number ri is successively counted by the operator at each pair of the minutiae displayed on the output device 25 and is filled out or entered in the minutia list, as shown at an eleventh step S11. For example, the ridge number becomes equal to three as to the specific minutia M and the adjacent minutia m2, as readily understood from FIG. 3. A technique of successively determining a pair of minutiae is disclosed in Japanese Unexamined Patent Publication No. Syo 55-138174, namely, 138174/1980 and will not be described any longer.

As long as an entry of the ridge number ri is not finished, the tenth and the eleventh steps S10 and S11 are repeatedly executed, as shown at a twelfth step S12. After each entry of the ridge numbers ri is finished, minutia list formulating operation is completed which is composed of the ninth through the twelfth steps S9 to S12. The minutia list is finally stored in the working storage 30.

Figure 5:
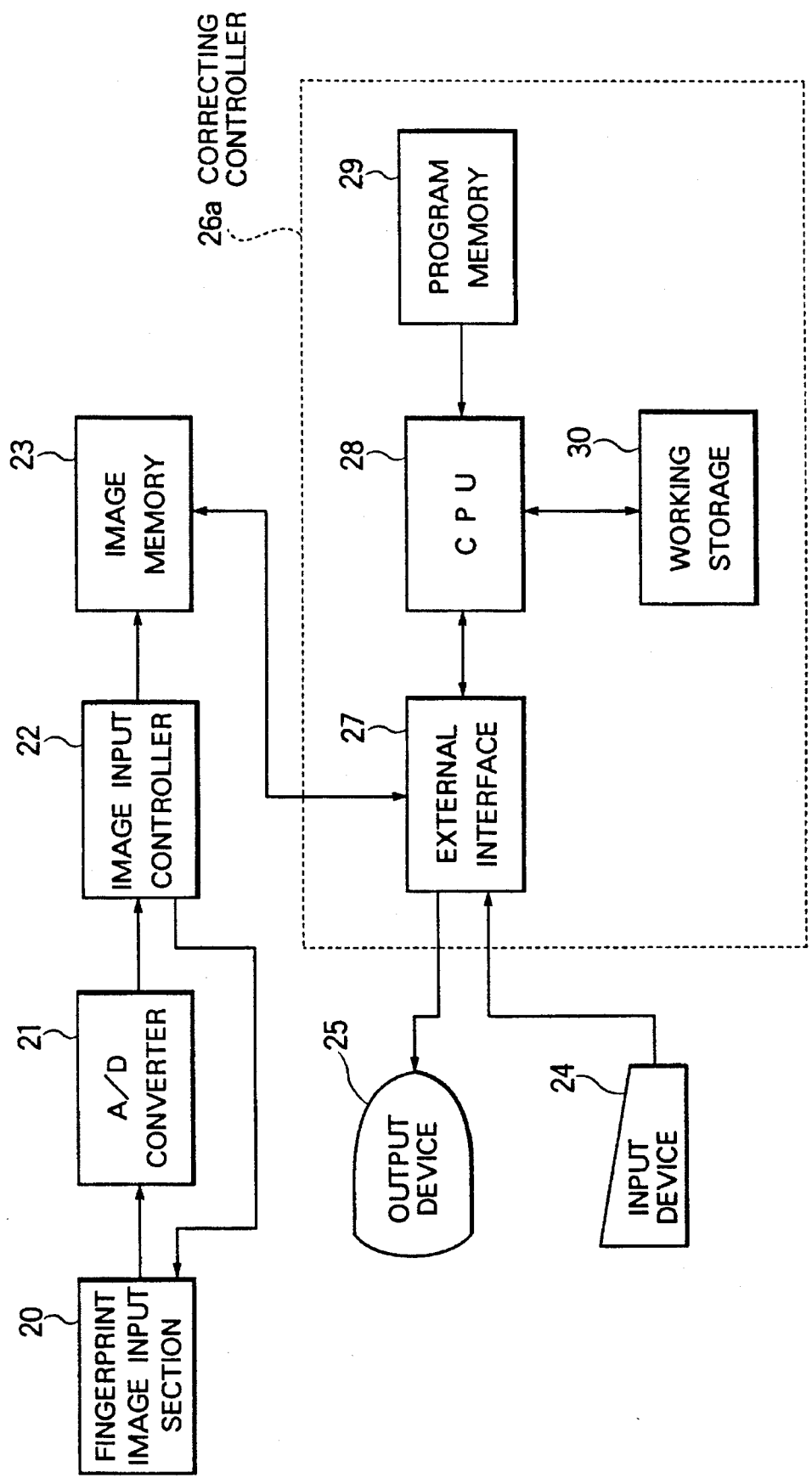
FIG. 5 is a block diagram of a fingerprint image processing system according to each of second and third embodiments of this invention.
Figure 6:
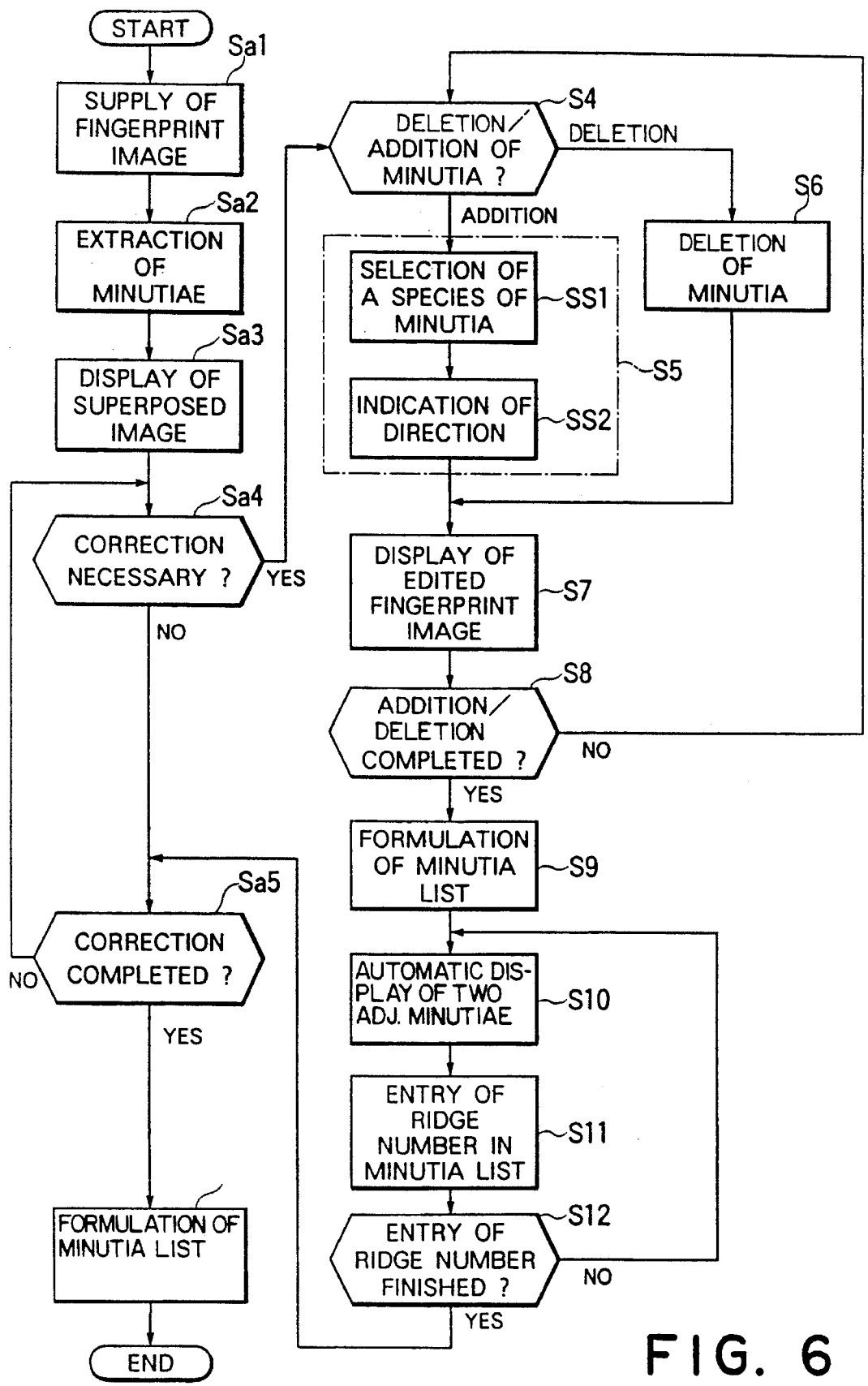
FIG. 6 is a flow chart for use in describing operation of the fingerprint image processing system according to the second embodiment of this invention.

Referring to FIG. 5 together with FIG. 6, a fingerprint image processing system according to a second embodiment of this invention is operable as a fingerprint minutia correction system for correcting an input fingerprint image and is similar in structure to that illustrated in FIG. 1 except that a correcting controller 26a of FIG. 5 is substituted for the editing processor 26 of FIG. 1 and is somewhat different in operation from that illustrated in FIG. 1, as will become clear as the description proceeds. Like in FIG. 1, the analog signals are extracted from the fingerprint in a manner described by Asai et al in U.S. Pat. No. 4,905,293 by the fingerprint image input section 20 and converted into the digital signals by the A/D converter 21 to be supplied to the image input controller 22 and to be thereafter memorized into the image memory 23. In other words, the digital signals are successively read out of the image memory 23 to be sent to the correcting controller 26a as input fingerprint signals representative of an input fingerprint image, as shown at a first input step Sa1.

Supplied with the input fingerprint signals, the correcting controller 26a successively and automatically extracts minutiae from the input fingerprint signals by the use of the external interface 27, the central processing unit 28, and the working storage 30 in accordance with the program in a known manner which is described in the above-referenced Japanese Unexamined Patent Publication No. 138174/1980, as shown at a second input step Sa2. The minutiae include the ridge endings, the bifurcations, as mentioned before. At the second input step Sa2, each of the minutiae is recognized as minutia data and can be processed as data signals which are different from a sole image. The minutia data signals are displayed as a minutia data image in the output device 25 with the minutia data image superposed on the input fingerprint image. Such superposition of the minutia data image on the input fingerprint image can be readily accomplished by the use of a usual technique to obtain a superposed image. At any rate, the superposed image is displayed on the output device 25 through the external interface 27 operable under control of the central processing unit 28, as shown at a third input step Sa3.

The third input step Sa3 is followed by a fourth input step Sa4 which judges whether or not the superposed image is to be corrected or modified by the help of the input device, such as a mouse device of the input device 24, manipulated by an operator. If the superposed image requires neither correction nor modification, the fourth input step Sa4 proceeds to a fifth input step Sa5 to judge whether or not correction is completed and to finish correcting operation.

On the other hand, if the superposed image needs correction or modification, the fourth input step Sa4 proceeds to the fourth step S4 which is identical with that of FIG. 2. The following fifth through the twelfth steps S5 to S12 are identical with those described in conjunction with FIGS. 2, 3, and 4 and will not be described any longer. In any event, entries of ridge numbers between a pair of minutiae are successively made into the minutia list to complete it.

After completion of the minutia list, the twelfth step S12 is followed by the fifth input step Sa5 to judge whether or not correction is finished. When the correction is finished, the correction operation comes to an end. At any rate, the minutia list is stored into the working storage 30.

In the above-mentioned examples, the ridge numbers are filled out by an operator by counting the ridge number of ridges between two adjacent minutiae.

Figure 7:
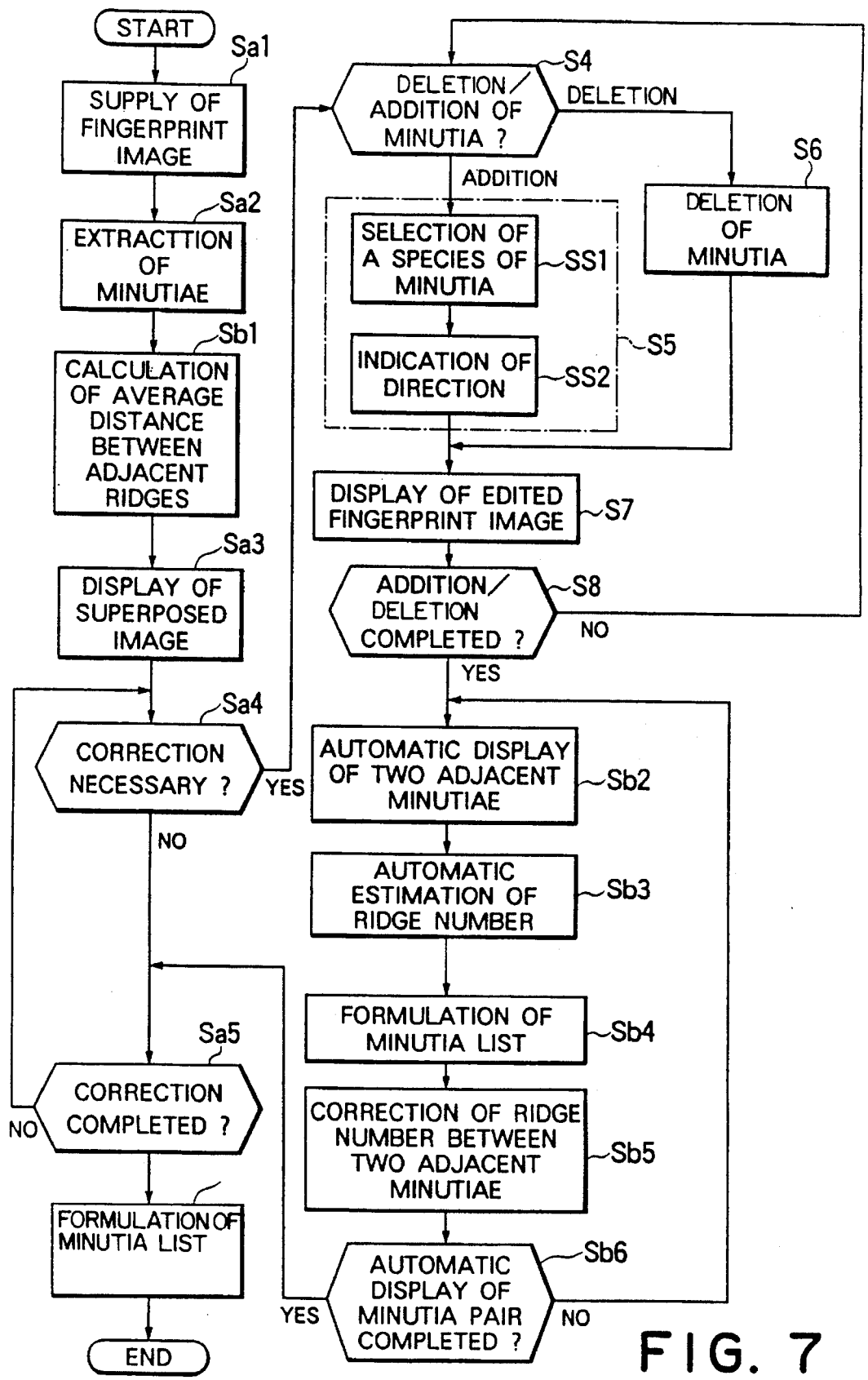
FIG. 7 is a flow chart for use in describing operation of the fingerprint image processing system according to the third embodiment of this invention.

Referring to FIG. 5 again and FIG. 7 afresh, a fingerprint processing system according to a third embodiment of this invention is operable as a fingerprint correcting system which can be shown by the same block diagram as that of the second embodiment. Therefore, the third embodiment will be described with reference to FIG. 5 again. Like in the second embodiment, the analog signals are extracted from the fingerprint in the known manner by the fingerprint image input section 20 and converted into the digital signals by the A/D converter 21 to be supplied to the image input controller 22 and to be thereafter memorized into the image memory 23. Like in FIG. 6, the digital signals which are memorized are successively read out of the image memory 23 to be sent to the correcting controller 26a as input fingerprint signals representative of an input fingerprint image, as shown at a first input step Sa1.

Responsive to the input fingerprint signals, the correcting controller 26a is similar in operation to that illustrated in FIG. 6 except that processing steps are somewhat modified relative to those shown in FIG. 6. Such modified steps are depicted at symbols Sb in FIG. 7 and will become clear later in detail. In the illustrated correcting controller 26a, minutiae are automatically extracted from the input fingerprint signals at the second input step Sa2 by the use of the external interface 27, the central processing unit 28, and the working storage 30 in accordance with the program read out of the program memory 29.

Thereafter, a first one of the modified steps, namely, a first modified step Sb1 is executed by the central processing unit 28 and the working storage 30 to calculate an average distance between two adjacent ridges laid among adjacent minutiae.

Figure 8:
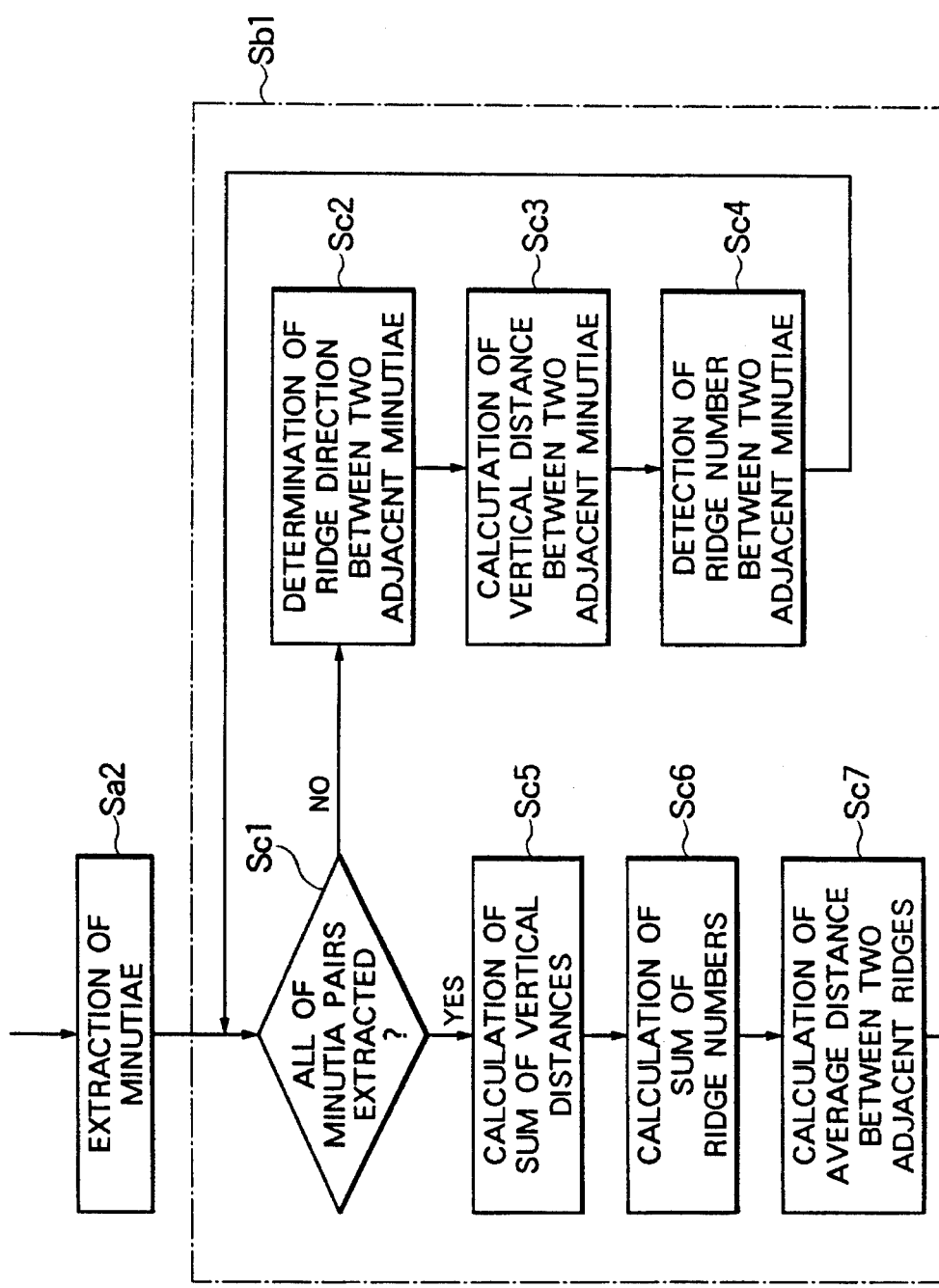
FIG. 8 is a flow chart for use in describing a part of the operation illustrated in FIG. 7 in detail.

Referring to FIG. 8, the first modified step Sb1 is divided into first through seventh local steps Sc1 to Sc7, as illustrated in FIG. 8. Herein, two adjacent ones of the minutiae are automatically selected or extracted as a minutia pair from the input fingerprint image to be displayed on the output device 25 in accordance with the program. In other words, a pair of the minutiae are automatically and successively displayed on the output device 25. Under the circumstances, it is judged at the first local step Sc1 whether or not all of the minutia pairs are extracted and displayed on the output device 25. While all the minutia pairs are not extracted from the input fingerprint image, the first local step Sc1 proceeds to a second local step Sc2.

Herein, let the two adjacent minutiae or the minutiae pair be represented by m1 and m2 which have vectors d1 and d2 representative of ridge directions at the two minutiae m1 and m2, respectively. In order to determine the average distance between adjacent ridges laid among all of the minutiae, calculation is at first made at a second local step Sc2 to determine a local direction d12 of the ridges between the two adjacent minutiae m1 and m2 in question. The local direction d12 is also represented by a vector and is calculated in accordance with the following equations. Namely:

$$d12 = d1 + d2 \quad (d1 \cdot d2 \geqq 0) \text{ and} \quad (1)$$

$$d12 = d1 - d2 \quad (d1 \cdot d2 < 0), \quad (2)$$

where the dot (.) represents an inner product of the vectors d1 and d2.

Figure 9:
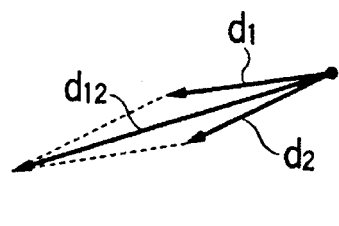
FIGS. 9 and 10 are views for use in describing a calculation carried out by the operation illustrated in FIG. 8.
Figure 10:
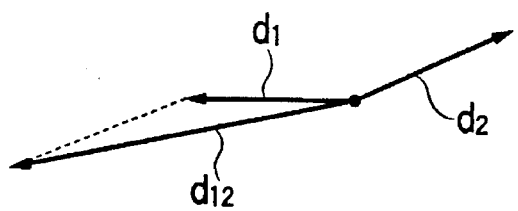

Temporarily referring to FIGS. 9 and 10, the local direction d12 is calculated in accordance with Equation (1), as illustrated in FIG. 9. This shows that Equation (1) is used when an angle between the vectors d1 and d2 is smaller than or equal to 90°. On the other hand, the local direction d12 is calculated in accordance with Equation (2), as shown in FIG. 10, when the angle between the vectors d1 and d2 is greater than 90°.

Figure 11:
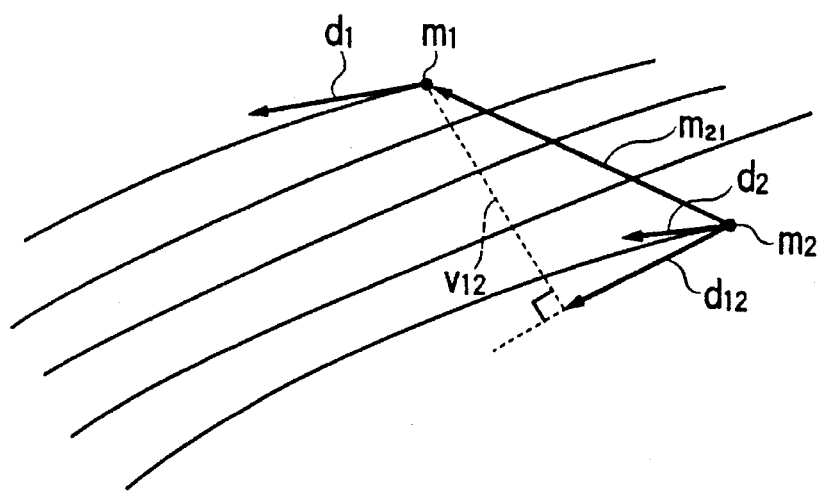
FIG. 11 is another view for use in describing another calculation carried out by the operation illustrated in FIG. 8.

Referring to FIG. 8 again and FIG. 11 afresh, the second local step Sc2 is succeeded by a third local step Sc3 to calculate a vertical distance V12 between the two adjacent minutiae m1 and m2. In this event, the vertical distance V12 is specified by a perpendicular line drawn from the minutia m1 to a line extended in the local direction d12, as shown in FIG. 11. Under the circumstances, the vertical distance V12 is given by:

$$V12 = (1/|d12|)[(|d12|)^2 \times (|m21|)^2 - (d12 \cdot m21)^2]^{1/2}, \quad (3)$$

where $|d12|$ is representative of a length of the vector d12; m21, a vector indicative of a direction and a length between the minutiae m1 and m2; and $|m21|$, a length of the vector m21.

After calculation of the vertical distance V12 between the two adjacent minutia m1 and m2, the ridge number between the two adjacent minutiae m1 and m2 is detected at a fourth local step Sc4. It is readily possible to detect the ridge number by calculating the ridges laid within the vertical distance V12.

Thus, when the ridge number is detected, the fourth local step Sc4 is returned back to the first local step Sc1. Similar operation is repeated until all of the minutiae pairs are extracted from the input fingerprint image at the first local step Sc1.

If all the minutiae pairs are extracted and displayed on the output device 25, the first local step Sc1 is followed by the fifth local step Sc5 to calculate a total sum S of the vertical distances, such as V12. Thereafter, a total sum N of the ridge numbers is also calculated at the sixth local step Sc6 which is succeeded by a seventh local step Sc7 to calculate the average distance V between two adjacent ridges. The average distance V between two adjacent ridges can be readily calculated by:

$$V = S(N+P), \quad (4)$$

where P is representative of the number of the minutiae pairs. At any rate, the first through the seventh local steps Sc1 to Sc7 are executed by the central processor unit 28 in accordance with the program read out of the program memory 29.

Thus, the first modified step Sb1 illustrated in FIGS. 7 and 8 is completed and followed by the third step Sa3 shown in FIG. 7.

In FIG. 7, the third through the fifth input steps Sa3 to Sa5 are successively carried out in the manner mentioned in conjunction with FIG. 6. As a result, the minutiae are superposed on the input fingerprint image on the output device 25 to be visually displayed. In addition, addition of a true minutia and deletion of a false minutia are executed through the fourth through the sixth steps S4 to S6 in the manner illustrated with reference to FIG. 6, so as to edit or correct the input fingerprint image into the edited or corrected fingerprint image.

Subsequently, the corrected fingerprint image is displayed on the output device 25 with only the real minutiae left as minutiae data signals until correction operation is finished, as illustrated at the seventh and the eighth steps S7 and S8.

When the correction operation is finished by completion of addition and/or deletion of the minutiae, a minutia list is automatically formulated in the example illustrated in FIG. 7. To this end, a second modified step Sb2 follows the eighth step S8 in FIG. 7 to automatically and successively display two adjacent ones of the minutiae. If the two adjacent minutiae are indicated, automatic estimation is carried out at a third modified step Sb3 as regards a ridge number laid between the two adjacent minutiae in question.

Figure 12:
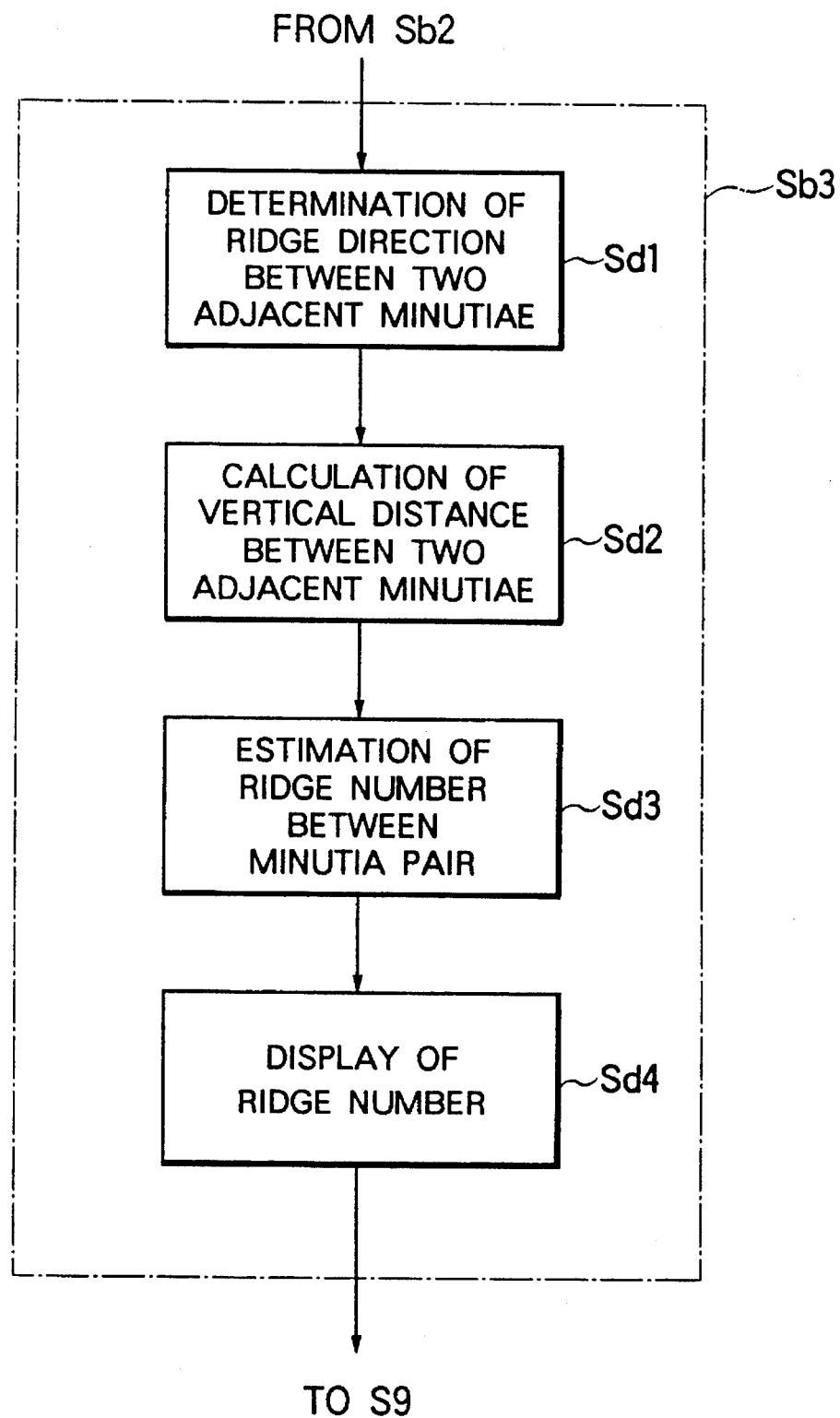
FIG. 12 is a flow chart for use in another part of the operation illustrated in FIG. 7 in detail.

Temporarily referring to FIG. 12, the third modified step Sb3 is divided into first through fourth subsidiary steps Sd1 to Sd4. At the first subsidiary step Sd1, a ridge direction is determined between the two adjacent minutiae by the use of Equations (1) and (2) in the manner described in conjunction with the minutiae m1 and m2 with reference to FIGS. 9 and 10. Consequently, the ridge direction is calculated in the form of a directional vector, such as d12, at the first subsidiary step Sd1.

The first subsidiary step Sd1 is succeeded by the second subsidiary step Sd2 to calculate a vertical distance V between the adjacent minutiae by the use of Equation (3). At the third subsidiary step Sd3, a ridge number between the adjacent minutiae is estimated by the use of the average distance V and the vertical distance, such as V12, calculated at the first modified step Sb1 and may be called an estimated ridge number Rc. More specifically, the estimated ridge number Rc is given by:

$$Rc = V12/V - 1. \qquad (5)$$

Thereafter, the estimated ridge number Rc is displayed on the output device 25 at the fourth subsidiary step Sd4.

Referring back to FIG. 7, the third modified step Sd3 is thus completed and followed by a fourth modified step Sd4 to formulate a minutia list like the ninth step S9 of FIG. 6. In the minutia list, the estimated ridge numbers are filled out as a result of estimation of the ridge numbers carried out at the third modified step Sb3 and are displayed together with the location (X, Y) and the minutia direction D. Inasmuch as such estimated ridge number might be different from an actual ridge number, a fifth modified step Sb5 is executed to correct the estimated ridge number into a correct ridge number by the help of an operator, if the estimated ridge number is incorrect. Thereafter, it is judged at a sixth modified step Sb6 whether or mot all of the minutia pairs are displayed on the output device 25. The above-mentioned operation is carried out as long as the minutia pairs are left undisplayed. Otherwise, the sixth modified step Sb6 is followed by the fifth input step Sa5 like in FIG. 6. Like in the first and the second embodiments, the minutia list is stored in the working storage 30.

While this invention has thus far been described in conjunction with a few embodiments thereof, it will readily be possible for those skilled in the art to put this invention into practice in various other manners. For example, not only minutiae but also ridges may be modified, namely, deletion from or added to the preedition or the input fingerprint image. A wide variety of minutia lists may be formulated without being restricted to the list illustrated in FIG. 4.

What is claimed is:

1. A fingerprint minutia correcting system for correcting an input fingerprint image extracted from an object to produce a corrected fingerprint signal representative of a corrected fingerprint image, said input fingerprint image including minutiae and ridges, said fingerprint minutia correction system comprising:

means for extracting said minutiae from said input fingerprint image to produce minutia data signals representative of said minutiae;

means for determining said ridges by using said minutia data signals;

means for calculating an average distance between two adjacent ones of said determined ridges;

display means for visually displaying said minutia data signals on said input fingerprint image;

pointing means operable in cooperation with said display means for indicating specific locations on said display means;

correcting means for correcting said minutia data signals on said displaying means by indicating each location on said display means by the use of said pointing means to leave real minutia data signals together with said fingerprint image on said display means and to obtain said corrected fingerprint image on said display means, said real minutia data signals being representative of real minutiae;

list formulating means for formulating a minutia list in relation to said real minutiae and said determined ridges by the use of said corrected fingerprint image;

means for storing said minutia list as said corrected fingerprint signal;

said list formulating means comprising:

means for automatically indicating an objective one of said real minutiae together with an adjacent one of said real minutiae;

means for detecting locations of said objective and said adjacent ones of the real minutiae;

means for calculating estimated ridge numbers between said objective and said adjacent ones of the real minutiae, using said average distance between two adjacent ones of said determined ridges, after detection of said locations of the objective and the adjacent ones of the real minutiae;

visual display means for displaying said estimated ridge numbers on said displaying means;

correcting means for correcting said estimated ridge numbers into corrected ridge numbers when said estimated ridge numbers are wrong; and means for successively memorizing the locations and said corrected ridge numbers into said minutia list.

2. A fingerprint minutia correcting system as claimed in claim 1, where said pointing means further comprises means for adding and for deleting minutia on said display means, whereby said input fingerprint image may be modified or corrected.

3. A fingerprint image processing system for processing an input fingerprint image extracted from an object to produce a processed fingerprint image signal representative of a processed fingerprint image, said input fingerprint image including minutiae and ridges, said fingerprint image processing system comprising:

means for determining said ridges by using said minutiae;

means for calculating an average distance between two adjacent ridges;

display means for visually displaying said input fingerprint image;

pointing means operable in cooperation with said display means for indicating specific locations on said display means;

modifying means for modifying said minutiae to leave real minutiae on said display means by indicating each location on said display means by the use of said pointing means and to obtain said processed fingerprint image on said display means;

list formulating means for formulating a minutia list in relation to said real minutiae and said ridges; and means for storing said minutia list as said processed fingerprint signal;

said list formulating means comprising:

means for automatically indicating an objective one of said real minutiae together with an adjacent one of said real minutiae;

means for detecting locations of said objective and said adjacent ones of the real minutiae;

means for calculating estimated ridge numbers between said objective and said adjacent ones of the real minutiae, using said average distance between two adjacent ones of said determined ridges, after detection of said locations of the objective and the adjacent ones of the real minutiae;

visual display means for displaying said estimated ridge numbers on said displaying means;

modifying means for modifying said estimated ridge numbers into modified ridge numbers; and means for successively memorizing the locations and said modified ridge numbers into said minutia list.

4. A fingerprint image processing system as in claim 3, where said pointing means further comprises means for adding and for deleting minutia on said display means, whereby said input fingerprint image may be modified or corrected.

5. A fingerprint image processing system as claimed in claim 3, wherein said modifying means comprises:

adding means for adding a supplementary minutia as one of said real minutiae to said input fingerprint image on said display means by indicating the location of said supplementary minutia on said display means by indicating the location of said supplementary minutia on said display means by the use of said point means; and deleting means for deleting a false one of said minutiae from said input fingerprint image on said display means by the use of said pointing means to leave said real minutiae.

6. A fingerprint minutia editing system for editing a preedition fingerprint image extracted from an object to produce an edited fingerprint signal representative of an edited fingerprint image, said edited fingerprint image including minutiae and ridges, said fingerprint minutia editing system comprising:

means for determining said ridges by using said minutiae;

means for calculating an average distance between two adjacent ridges;

display means for visually displaying said preedition fingerprint image;

pointing means operable in cooperation with said display means for indicating specific locations on said display means;

editing means for editing said preedition fingerprint image on said display means by indicating said minutiae by the use of said pointing means to leave real minutiae on said display means and to obtain said edited fingerprint image on said display means;

list formulating means for formulating a minutia list in relation to said real minutiae and said ridges; and means for storing said minutia list as said edited fingerprint signal;

said list formulating means comprising:

means for automatically indicating an objective one of said real minutiae together with an adjacent one of said real minutiae;

means for detecting locations of said objective and said adjacent ones of the real minutiae;

means for calculating estimated ridge numbers between said objective and said adjacent ones of the real minutiae, using said average distance between two adjacent ones of said determined ridges, after detection of said locations of the objective and the adjacent ones of the real minutiae;

visual display means for displaying said estimated ridge numbers on said displaying means;

modifying means for modifying said estimated ridge numbers into modified ridge numbers; and means for successively memorizing the locations and said modified ridge numbers into said minutia list.

7. A fingerprint minutia editing system as claimed in claim 6, where said pointing means further comprises means for adding and for deleting minutia on said display means, whereby said input fingerprint image may be modified or corrected.

8. A fingerprint editing system as claimed in claim 6, wherein said editing means comprises:

adding means for adding a supplementary minutia as one of said real minutiae to said preedition fingerprint image on said display means by indicating the location of said supplementary minutia on said display means by the use of said pointing means;

deleting means for deleting a false one of said minutiae from said preedition fingerprint image on said display means by the use of said pointing means to leave said real minutiae.

\* \* \* \* \*

UNITED STATES PATENT AND TRADEMARK OFFICE
CERTIFICATE OF CORRECTION

PATENT NO. : 5,524,161
DATED : June 4, 1996
INVENTOR(S) : Ritsuko OMORI, et al.

It is certified that error appears in the above-indentified patent and that said Letters Patent is hereby corrected as shown below:

Column 3, line 48, delete "ere" and insert --are--.

Column 9, line 32, delete "mot" and insert --not--.

Signed and Sealed this

Twenty-fourth Day of December, 1996

Attest:

BRUCE LEHMAN

*Attesting Officer*    *Commissioner of Patents and Trademarks*